United States Patent [19]
Retta et al.

[11] Patent Number: 5,138,871
[45] Date of Patent: Aug. 18, 1992

[54] METHOD AND APPARATUS FOR TESTING THE PERMEABILITY OF PROPHYLACTICS

[75] Inventors: Stephen M. Retta, Hyattsville; Jean Rinaldi, Silver Spring; Ronald Carey, Columbia; William A. Herman, Silver Spring; T. Whit Athey; Bruce A. Herman, both of Rockville, all of Md.; Harold Stewart, Nashville, Tenn.

[73] Assignee: The United States of America as represented by the Department of Health and Human Services, Washington, D.C.

[21] Appl. No.: 505,268

[22] Filed: Apr. 6, 1990

[51] Int. Cl.⁵ .............................................. G01M 3/20
[52] U.S. Cl. ........................................ 73/38; 73/40.7
[58] Field of Search ................ 73/40, 40.7, 45.5, 38

[56] References Cited

U.S. PATENT DOCUMENTS

| | | |
|---|---|---|
| 2,213,113 | 8/1940 | Youngs . |
| 2,244,591 | 6/1941 | Youngs et al. . |
| 2,292,983 | 8/1942 | Youngs . |
| 2,567,926 | 9/1951 | Dunkelberger . |
| 4,776,209 | 10/1988 | Patchel ............................ 73/45.5 |
| 4,875,358 | 10/1989 | Marsh et al. ......................... 73/40 |

FOREIGN PATENT DOCUMENTS

| | | | |
|---|---|---|---|
| 1244525 | 7/1986 | U.S.S.R. .............................. 73/40.7 |
| 1295249 | 3/1987 | U.S.S.R. .............................. 73/40.7 |

OTHER PUBLICATIONS

Weiss et al., "Chemically and Electrically Controlled Membranes: Size Specific Transport of Fluorescent Solutes Through PMAA Membranes", AIChE Symposium Series, vol. 82, No. 250, pp. 85-98.

Schmukler et al., "Testing of the Barrier Function of Condoms: An Overview", The American Society of Mechanical Engineers, 89-WA/NDE-1 (Dec. 10-15, 1989), pp. 1-8.

McLaughlin, "The Electrostatic and Electrokinetic Properties of Biological Membranes: New Theoretical Models and Experimental Results", pp. 1-5.

Conant et al., "Herpes Simplex Virus Transmission: Condom Studies", *Sexually Transmitted Diseases*, vol. 11, No. 2, Apr.-Jun., 1984, pp. 94-95.

Judson et al., "In Vitro Evaluations of Condoms With and Without Nonoxynol 9 As Physical and Chemical Barriers Against Chlamydia Trachomatis, Herpes Simplex Virus Type 2, and Human Immuno-deficiency Virus", *Sexually Transmitted Diseases*, vol. 16, No. 2, Apr.-Jun., 1989, pp. 51-56.

Katznelson et al., "Efficacy of the Condom as a Barrier to the Transmission of Cytomegalovirus", *The Journal of Infectious Diseases*, vol. 150, No. 1, Jul. 1984, pp. 155-157.

Lytle et al., "Virus Leakage Through Natural Membrane Condoms", From the Division of Life Sciences, pp. 1-17.

Minuk et al., "Efficacy of Commercial Condoms in the Prevention of Hepatitis B Virus Infection", *Gastroenterology*, vol. 93, No. 4, 1987, pp. 710-714.

Rietmeijer et al., "Condoms as Physical and Chemical Barriers Against Human Immunodeficiency Virus", *JAMA*, vol. 259, No. 12, Mar. 25, 1988, pp. 1851-1853.

Van de Perre et al., "The Latex Condom, an Efficient Barrier Against Sexual Transmission of AIDS-Related Viruses", *AIDS*, vol. 1, No. 1, 1987, pp. 49-52 Letters, *JAMA*, vol. 256, No. 11, Sep. 19, 1986, pp. 1442-1443.

*Primary Examiner*—Hezron E. Williams
*Assistant Examiner*—Joseph W. Roskos
*Attorney, Agent, or Firm*—Lowe, Price, LeBlanc & Becker

[57] ABSTRACT

An apparatus and method for evaluating the permeability of membrane articles, particularly condoms and gloves, is designed to quantify physiologic conditions which exist during use of the articles. Permeability is determined by monitoring fluorescent microspheres of approximately the size of HIV which pass through the membrane articles.

20 Claims, 3 Drawing Sheets

METHOD AND APPARATUS FOR TESTING THE PERMEABILITY OF PROPHYLACTICS

TECHNICAL FIELD

The present invention relates to methods and apparatus for evaluating the permeability of membranes. More particularly, the present invention relates to methods and apparatus for evaluating the permeability of condoms.

BACKGROUND ART

As of Aug. 1, 1989, there were U.S. Pat. No. 102,621 cases of acquired immunodeficiency syndrome (AIDS) in the United States as reported to the Centers for Disease Control (CDC) (published data, "Statistics from the World Health Organization and The Centers for Disease Control," *AIDS*, Oct. 1989, 3(10):677–681. This is almost double the number reported as of Jan. 6, 1988 (51,916) (published data, "Statistics from the World Health Organization and The Centers for Disease Control," *AIDS*, 2(1):65–69). The alarming increase of AIDS cases has increased the attention given to barrier devices such as condoms. The U.S. Public Health Service has strongly advised the use of condoms to combat the sexual transmission of this deadly disease for those who neither practice abstinence nor maintain a faithful monogamous relationship (brochure, "Understanding AIDS," HHS Publication No. (CDC)HHS-888404, U.S. Government Printing Office, 1988). Although the use of condoms will not assure absolute safety of the user against the transmission of viral disease, it is expected to reduce the risk of transmission. This expectation, however, is based on mostly qualitative evaluations.

Epidemiologic studies on the use of condoms as prophylactics suggest that condoms can be effective. D. Barlow, "The condom and gonorrhea," *Lancet*, 15 Oct. 1977, 2(8042):811–812, found that those who reported used condoms "correctly" (consistently) were at a lower risk of contracting bacterial transmitted gonorrhea than those who reported used condoms "incorrectly" (inconsistent use or some unprotected genital contact). Furthermore, the group of "incorrect" users was not statistically better off than the group who did not use condoms at all. Still, about 4% of the subjects who used condoms correctly contracted gonorrhea.

Fischl et al, "Evaluation of heterosexual partners, children, and household contacts of adults with AIDS," *JAMA*, 6 Feb. 1987, 257(5):640–644, conducted a study where human immunodeficiency virus (HIV) seropositive patients and their HIV seronegative partners were monitored for 1–3 years after diagnosis. They found that only 1 of 10 partners who were sexually active and used condoms seroconverted whereas, 12 of 14 who were sexually active and did not use condoms seroconverted. Also, 0 of 8 seroconverted who remained abstinent. From these studies, the source of the failure to prevent transmission of STDs when condoms were used is difficult to assess.

The quality control protocol used by manufacturers to screen condoms, which was established by the American Society for Testing and Materials (ASTM), calls for filling the condom with 300 ml of water, suspending the condom, and inspecting the surface for leakage (see ASTM, D 3492-83). The test is designed for rapid testing of large numbers of condoms. A lot of condoms is rejected if the number of samples that fail the test meets or exceeds the rejection number associated with an Acceptable Quality Level (AQL) of 0.4% (see MIL-STD-105D). The Food and Drug Administration (FDA) routinely inspects manufacturers to assure that this level of quality continues, using a similar water fill test which also provides for rapid bulk testing. Neither the ASTM nor the FDA test protocols, however, are very similar to the physiologic situation. The geometry of expansion when 300 ml of water is poured into the condom, for example, is not very similar to physiologic expansion.

A number of studies using a basic experimental design with a simple plunger to simulate sexual intercourse have been designed to qualitatively model physiologic conditions. Katznelson et al, "Efficacy of the condom as a barrier to the transmission of cytomegalovirus," *J. Infect Dis.*, July 1984, 150(1):155–157, working with cytomegalovirus (CMV), in a static experiment, found that no transmission was detected from 12 latex condoms incubated at 37° C. for 15, 30, and 60 minutes with 2 ml of virus suspension. Five condoms sampled after 30 minutes of simulated sexual intercourse showed no transmission of CMV.

Conant et al, "Herpes simplex virus transmission: Condom studies," *Sex Transm. Dis.*, Apr–Jun 1984, 11:94–95, working with herpes simplex virus type-2 (HSV-2), found that, when condoms were placed on a syringe plunger with 4 ml of virus suspension inside, and then "pushed up and down forcefully 50 times" in the syringe barrel, no transmission was detected through the one latex and the one natural membrane condoms tested. In a more recent study using a similar experimental design, Conant, working With HIV and a mouse retrovirus, reported no transmission through three latex and two natural membrane condoms (Conant et al, "Condoms prevent transmission of AIDS-associated retrovirus," *JAMA*, 4 April 1986, 255(13):1706.

Van De Perre et al, "The latex condom, an efficient barrier against sexual transmission of AIDS-related viruses," *AIDS*, May 1987, 1(1):49–57, using a modified Conant model with 3 ml HIV suspension, at 37° C., found transmission after 60 minutes in 0 of 10 latex condoms, and in 1 of 2 natural membrane condoms.

Rietmeijer et al, "Condoms as physical and chemical barriers against human immunodeficiency virus," *JAMA*, 25 March 1988, 259(12):1851–1853, also working with HIV, but using an ethylene oxide-sterile form and a graduated cylinder for plunger and receptacle respectively, found no transmission in 10 latex condoms.

Judson et al, "In vitro evaluation of condoms with and without nonoxynol 9 as physical and chemical barriers against chlamydia trachomatis, herpes simplex virus type 2, and human immunodeficiency virus," *Sexually Transmitted Diseases*, Apr.–June 1989, 16(2):51–56, working with chlamydia trachomatis, HSV-2, and HIV, using the setup of Rietmeijer, found no transmission of chlamydia for 50 latex condoms. No transmission of HSV-2 or HIV was detected for 10 latex condoms.

While these studies support the assessment that condoms reduce the risk of transmission, the small sample size and the nonphysiologic character of the models used, makes a realistic quantitative assessment of condom efficacy as a barrier in the physiologic environment impossible. In addition, these studies and others like them lack any positive controls which would demonstrate the ability of the test to detect leakage.

Minuk et al, working with hepatitis B virus (HBV), hepatitis B surface antigen (HBsAg), herpes simplex virus (HSV) and CMV, using a vibration design instead of the plunger, found no transmission of any viral probe through 15 latex condoms tested with each of these probes. However, the smallest probes, HBSAg (22 nm) and HBV (42 nm), passed through three natural membrane condoms still, some important conditions during intercourse are only qualitatively simulated by the vibrator. When such test methods are used to interpret the value of added measures of protection such as nonoxynol-9, as was done in the studies by Rietmeijer and Judson, assessment of the added benefit can only be qualitative.

Lytle et al, working with $\phi$X174 and HSV in a study of natural membrane condoms only, using a beaker and a mixing bar for agitation, found that 12 of 26 natural membrane condoms leaked the smaller $\phi$X174 virus (27 nm diameter). Also, when a mixture of $\phi$X174 and HSV (150 nm diameter) was used, 2 natural membrane condoms which did leak $\phi$X174 did not leak HSV. The study indicated that leakage of a small virus does not necessarily indicate leakage of a larger virus and that leakage rates through natural membranes were quite variable.

The present invention is an improvement over prior methods utilized for testing condoms, which quantifies physiologic conditions. Moreover, the present invention provides a method of evaluating the permeability of a variety of membrane articles.

DISCLOSURE OF THE INVENTION

It is accordingly one object of the present invention to provide for an apparatus for evaluating the permeability of membranes.

Another object of the present invention is to provide for an apparatus for evaluating the permeability of articles made from rubber, latex and other elastomeric materials.

It is a further object of the present invention to provide for an apparatus from evaluating the permeability of condoms or gloves.

An even further object of the present invention is to provide for an apparatus for evaluating the permeability of condoms at physiological conditions.

A still further object of the present invention is to provide a method of evaluating the permeability of membranes.

A still further object of the present invention is to provide a method of evaluating the permeability of articles made from rubber, latex and other elastomeric materials.

A still further object of the present invention is to provide a method of evaluating the permeability of condoms or gloves.

An even further object of the present invention is to provide a method of evaluating the permeability of condoms at physiological conditions.

According to the present invention there is provided an apparatus for evaluating the permeability of a membrane article which comprises:

a test chamber for containing a first fluid;

means to mount a membrane article in the test chamber so as to isolate the interior of the membrane article from the first fluid within the chamber, the mounting means including at least one port for supplying a second fluid to the interior of the membrane article;

means for supplying a second fluid to the interior of the membrane article, the second fluid containing inert detectable particles;

means for detecting for the presence of the inert detectable particles in the first fluid in the test chamber; and means for circulating the second fluid between the test chamber and the detection means, whereby the detection means detects for inert detectable particles which pass from the second fluid through the membrane article and into the first fluid.

The present invention also provides for an apparatus for evaluating the permeability of condoms which comprises:

a test chamber for containing a first fluid;

means to mount a condom in the test chamber so as to isolate the interior of the condom from the first fluid within the chamber, the mounting means including at least one port for supplying a second fluid to the interior of the condom;

means for supplying a second fluid to the interior of the condom, either the first or the second fluid containing inert detectable particles;

means for detecting for the presence of the inert detectable particles in at least one fluid in the test chamber; and means for circulating the fluid not initially containing the inert detectable particles between the test chamber and the detection means, whereby the detection means detects for inert detectable particles which pass from the initially inert particle containing fluid through the condom and into the initially particle free fluid.

Moreover, the present invention provides for a method for evaluating the permeability of membrane articles which comprises:

mounting the membrane article in a test chamber where one side is filled with a first fluid;

supplying a second fluid to the other side of the membrane article, either the first or the second fluid containing inert detectable particles;

monitoring the initially inert detectable particle free fluid to determine the presence of the inert detectable particles which have passed from the initially particle containing fluid through the membrane article and into the initially inert detectable particle free fluid.

BRIEF DESCRIPTION OF THE DRAWINGS

The present invention will now be described with reference to the annexed drawings which are given by way of non-limiting examples only in which.

BEST MODE FOR CARRYING OUT THE INVENTION

Figure 1:
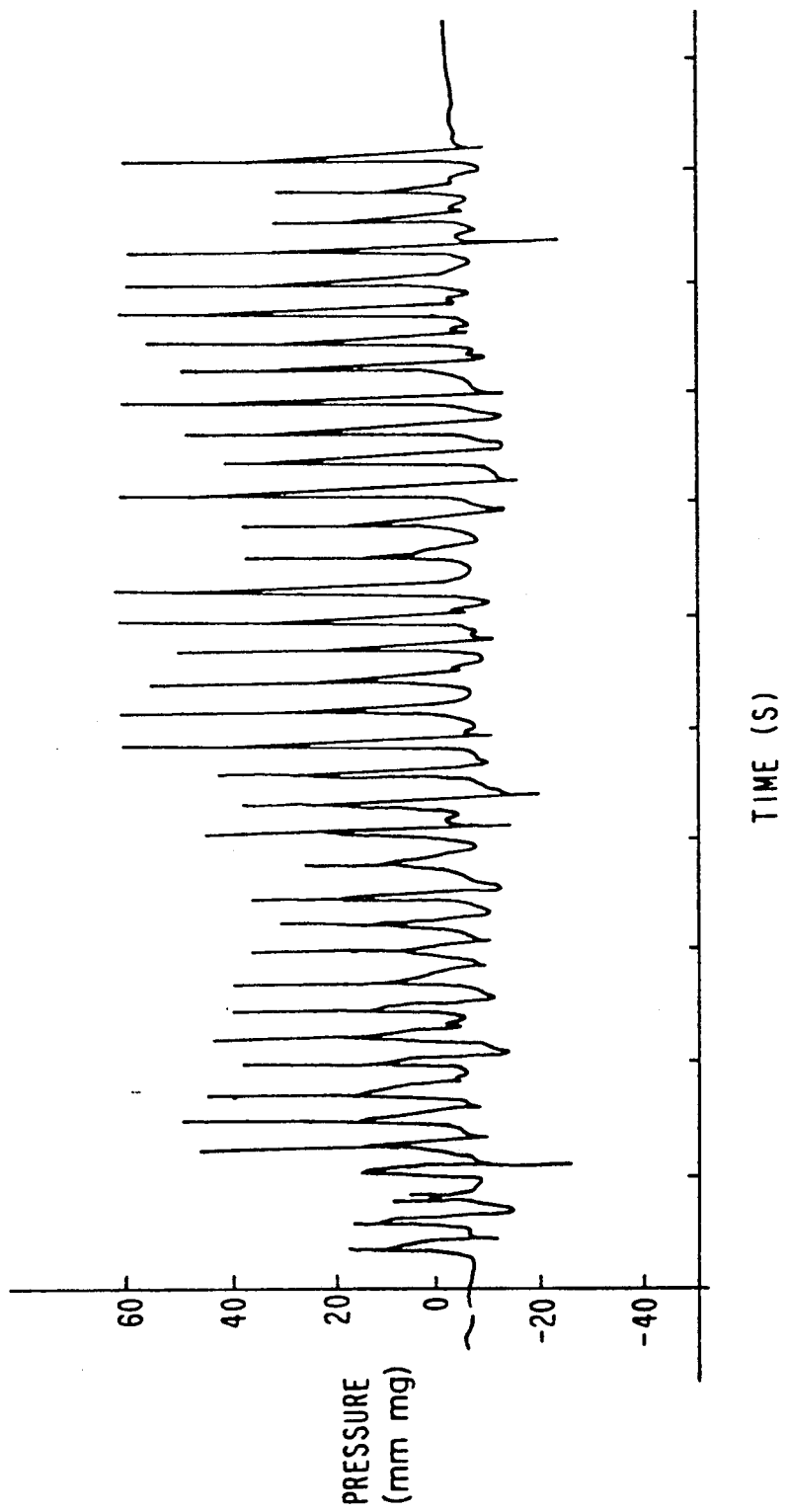
FIG. 1 is a strip chart record of the pressure differential of a mechanically simulated artificial coitus.

The overall ability of condoms to control the transmission of AIDS and other sexually transmitted diseases (STDs) in the general population can be summarized as depending on many contributing factors: the permeability of the intact barrier material, the susceptibility of the barrier material to breakage; the level of manufacturing quality, the effect of chemicals such as spermicides on viral viability and material integrity, the effect of environmental conditions during storage, and the tendency to use condoms properly. The present invention is directed to a new test method which evaluates the permeability of the intact condom, when subjected to simulated physiologic conditions.

To properly test the barrier effectiveness of condoms, the physical and chemical conditions present during coitus were evaluated and incorporated into the test system of the present invention. Viral characteristics (size and titer), geometry, pressure, time, wetting/surface tension, viscosity, temperature, pH, and ion concentration were all considered. The relevant physiologic conditions and their values are listed in Table I below.

TABLE I

| PHYSIOLOGIC PARAMETER | | |
|---|---|---|
| Parameter | Value | Rationale |
| Microsphere Size | 110 nm | HIV size (90-130 nm) |
| Microsphere Titer | $3.4 \times 10^{11}$/ml | Sensitivity |
| Geometry | 16 cm long 1.94 cm radius | Kinsey data |
| Pressure | 60 mmHg | In-vitro Experiments |
| Time | 30 minutes | Sensitivity |
| Wetting | 15°-30° | Body fluids wet latex |
| Surface Tension | .03 N/m | Body fluids wet latex |
| Viscosity | .70 cP | Facilitates flow |
| Temperature | 37° C. | Body temperature |
| pH | 7.1 | In range of body fluids |
| Ion concentration | equal | No partial pressure differences |

The model developed here does not directly include motion, but does incorporate the maximum expected motion-generated pressure.

Physiological parameters may be altered depending on the particular virus or other material (such as an allergen or toxin) one does or doesn't wish to pass through the membrane and the conditions under which one will be using the membrane. For example, surgical gloves should be tested under suitable conditions and for sufficient duration to approximate their eventual intended use.

HIV has been found in body fluids associated with sexual activity. However, little is known about viral titer for HIV in body fluids other than blood. In the blood of asymptomatic HIV positive patients there are approximately 60 tissue-culture infective doses (TCID) per milliliter. The concentration in symptomatic patients is about 100 times higher. The relative importance of mononuclear cell-bound HIV and cell-free HIV is unknown. Given these uncertainties, the method of the present invention was conducted modelling cell-free virus, with concentrations chosen to maximize sensitivity within practical limits. To avoid using HIV, "inert" fluorescent monodispersed polystyrene microspheres were utilized in the present method. Herein, "inert" is utilized to refer to "non-viable" or "inviable" materials with the understanding that the microspheres may be chemically or spectrophotometrically active for detection purposes, but biologically inert or otherwise incapable of replication within the test system. The average diameter of the microspheres utilized was 110 nm, with a 1.6 coefficient of variation (roughly, ±2 nm). This can be compared with the spherical shaped HIV particles which have a diameter of 90-130 nm. The microspheres, which were supplied in a concentrated suspension, were diluted in a phosphate buffered saline solution with an added surfactant (3M, "Fluorad," Potassium fluorinated alkyl carboxylate fluorochemical surfactant), to a concentration of about $3.4 \times 10^{11}$ microspheres per ml.

Some prior test methods stretch condoms in non-physiologic ways. Any pores in the membrane will be distorted by the stretching so it is important that the membrane be tested in the shape and size that it is normally subjected to. Values determined from data accumulated by Kinsey (Gebhard et al, "The Kinsey Data: Marginal Tabulations of the 1983-1963 Institute for Sex Research," W. B. Saunders Company, 1979, 116-120), using mean anthropomorphic dimensions of the erect penis, are a 1.94 cm radius and a 16 cm length. In the present test system, a nylon mesh restrainer restricts expansion of the condom to these dimensions when the condom is filled with the test solution.

The pressure gradient across the condom will determine the flow rate which is expected to vary greatly during intercourse. The dynamic nature of coital pressures suggests the possibility of modeling with a simple periodic waveform. However, the magnitude and frequency of such a waveform is not known. Experimental methods used in other studies have attempted to represent the dynamic character of coitus using syringe and plunger models with no experimental or physiologic basis. The maximum systemic arterial pressure attainable during an erection is about 350 mmHg with typical values being in the neighborhood of 90-100 mmHg. The intravaginal pressure, then, is likely to be lower than this in order for the male to maintain an erection.

Since no data exist which give the pressure gradient across the condom during coitus, it was necessary to carry out laboratory experiments to get an estimate. These experiments found that a more physiologic peak pressure gradient value is 60 mmHg. This was determined with commercially-available latex rubber devices simulating the male and female sexual organs. The dildo was fitted with a pressure probe mounted in the tip. A second pressure probe was mounted in the simulated vaginal wall. A condom was placed over the dildo and then the dildo was inserted into the vaginal device. Coitus was then simulated mechanically while differential pressure was monitored with a strip chart recorder which is illustrated in FIG. 1. The peak differential pressure found was near 60 mmHg.

Accordingly, a static pressure of 60 mmHg was applied to the fluid inside the condom by a fluid column leading to the filling reservoir and adjusted by the level of the fluid of the reservoir.

A typical time interval is difficult to determine from the available data. Since it may be necessary to detect very small flow rates, the longer the test the better the sensitivity. However, too long a time interval may damage condoms or otherwise invalidate results. If the latex condom is tested for long periods of time, for example, the uptake of water by latex will eventually swell the material. The typical time of intromission during vaginal intercourse is about 2 minutes. The time period used in the present test system was 30 minutes which is perhaps longer than typical. In preliminary tests with latex condoms and latex condoms with laser induced holes, the presence of a hole was apparent as a slow linear rise of fluorescence signal. Extending the measurement to 30 minutes enhances sensitivity. The value of the volume of flow can be proportionally adjusted to reflect a shorter time interval if appropriate.

From analysis of flow through surgical and examination gloves we know that, for contact angles of less than 90° (solid surface wetted by fluid), fluid will actually be drawn through a hole by capillary action and flow will be limited by surface tension at the exit of the hole. As a droplet forms at the exit opening, surface tension resists continued capillary or other fluid pressure unless a certain critical pressure is overcome. However, with liquid on either side of the barrier, as in the physiologic case, surface tension will not resist flow once any passageway is fluid filled. Therefore, a good wetting agent and low surface tension is important to allow all relevant pores to pass fluid.

Physiologic values are unknown, except for the surface tension of semen which is 0.066 N/m. It is well known that proteins, which are found in body fluids such as semen, act as good wetting agents by lowering surface tension. When a surfactant ("Fluorad," 3M) was added to the test solution, the contact angle was measured to decrease from 90°–100° to 15°–30° by observing a droplet of test solution on a dry latex surface. The surface tension was measured to be 0.03 N/m using a method measuring capillary action. Although surfactants are available which reduce the surface tension still further this fluorochemical surfactant showed the least interference with the fluorescence measurement.

The viscosity of semen has been reported as 14.1 centipoise at 25° C. and ranges from 3.5 centipoise to 54.5 centipoise (C. Lentner (editor), *Geigy Scientific Tables*, CIBA-GEIGY Limited, 1981, 1:186). However, the viscosities of other relevant body fluids are unknown. Since flow rate is inversely proportional to the viscosity, the more viscous a material, the slower the flow rate. The flow rate results can be proportionally adjusted for other viscosities. Therefore, the sensitivity of any leak test can be increased by using a fluid of lower viscosity. Given the uncertainties of viscosity in the physiologic environment, viscosity of the test fluid was set for greatest sensitivity. The viscosity of the solution and bath fluids was 0.70 centipoise at 37° C. (measured with a Brookfield Digital viscometer, Model DV-II, Sloughon, MA).

The most appropriate temperature to approximate physiologic conditions is human body temperature, 37° C. A lower temperature will reduce viscosity, thus decreasing any flow through the barrier material. Temperature may also affect the barrier properties of condom materials.

The pH in the physiological environment is extremely varied. The pH of the vagina ranges from about 4.0 to 5.0 during the menstrual cycle (R. W. Kistner (editor), *Gynecology: Principles and Practice* (4th Edition), Year Book Medical Publishers Inc., Chicago, 1986, p. 71) and may be as low as 3.5 (Bell et al, *Textbook of Physiology and Biochemistry* (9th Edition), Churchill Livingston, N.Y., 1976, p. 646). Semen pH is around 7.2 to 7.8 but has a buffering capacity which enables the sperm to survive and maintain mobility in the harsh low pH environment of vaginal fluids (Wolters-Everhardt et al, "Buffering capacity of human semen," *Fertility and Sterility*, Jul. 1986, 46(1):114–119). A study by Fox et al found that the vaginal pH changed from 4.3 to 7.2 with the buffering capacity of normal semen ejaculation (Lue et al, "Physiology of erection and pharmacological management of impotence," *J. Urology*, 1987, 137:829–836. Commercially-available phosphate buffered saline solution used for tests conducted by the present invention maintains the pH at 7.1, which is well within the physiologic range and about the value achieved with seminal buffering.

The molecular content of biological fluids is quite complicated and therefore would be difficult to mimic in test solutions. Differences in molecular content between the body fluids involved further complicate the task. A difference in molecular or ion concentration can result in movement of fluid across a barrier due to partial pressure differences. How this phenomena could be a factor in condom effectiveness is not clear. However, care was taken to assure equal ion concentrations in the test fluids to eliminate any complications due to partial pressure differences.

Figure 2:
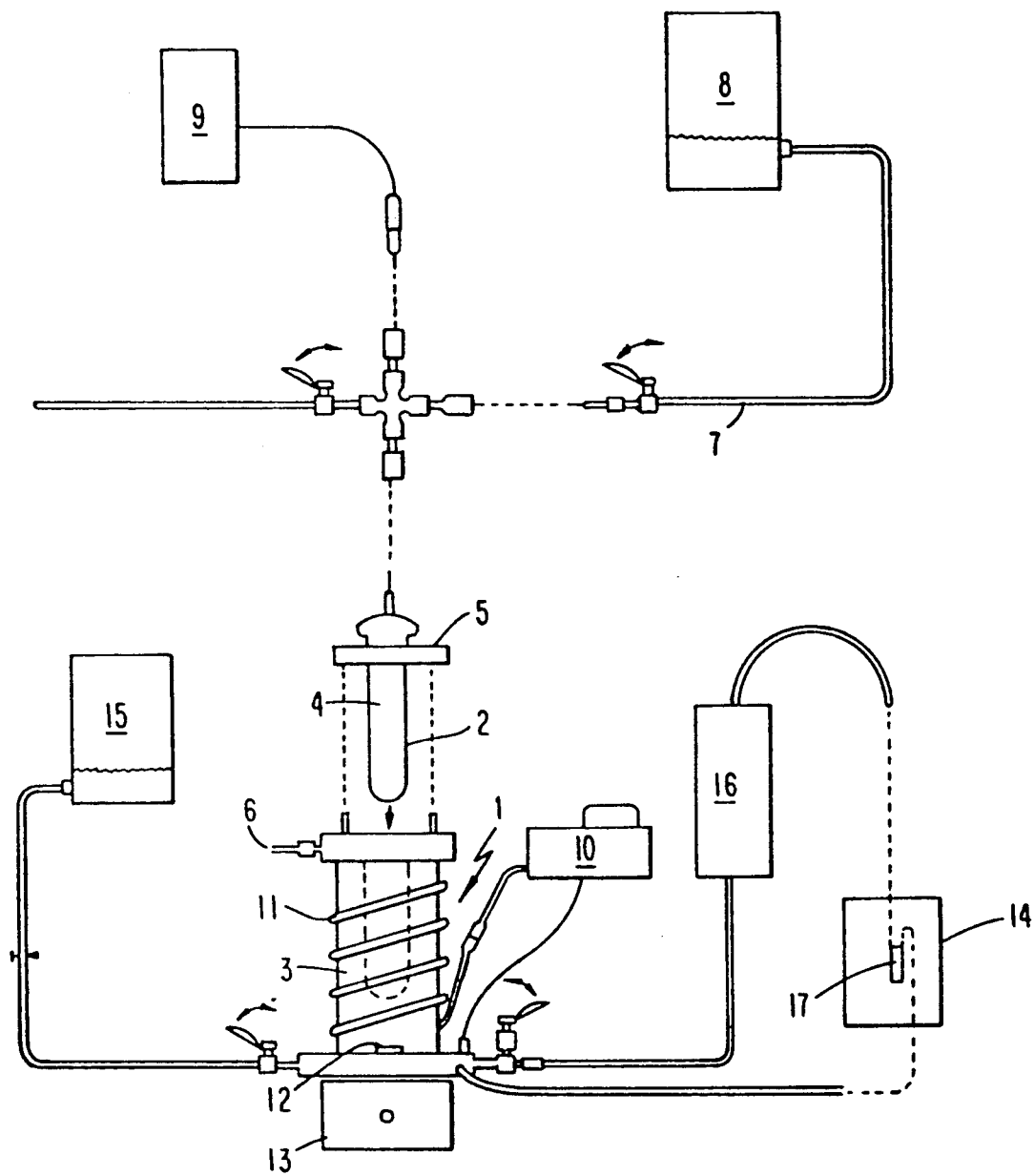
FIG. 2 is a schematic illustration of the test system of the present invention according to one embodiment.

As illustrated in FIG. 2, the test apparatus includes a specially designed test chamber 1 in which the membrane article, i.e., condom 2 is secured. Expansion of the condom is restricted to physiologic dimensions by using a nylon mesh restrainer 3. Using the mean anthropomorphic dimensions of male subjects, the restrainer 3 is designed to restrict expansion of the condom to a 1.94 cm radius and a length of 16 cm. The condom 2 is unrolled over a contoured delrin form 4 which has a slightly smaller radius (1.82 cm) than the restrainer 3. The condom 2 is secured on the form with a rubber O-ring approximately 14 cm (5.5 inches) from the end of the condom on the contoured form. This length is the section of the condom which is inspected for leakage in the FDA and ASTM water tests. The contoured form is carefully designed to have no sharp or abrasive edges which may induce holes or weaken areas in the condom being tested.

The contoured form attaches to a means for mounting or holding piece 5 which fits snugly around the same O-ring that secures the condom to the contoured form so that any leakage from the inside of the condom over the condom lip cannot come into contact with the outer surface. The contoured form piece fits on top of the test or bath chamber 1 so that the contoured form projects into the chamber bath. The bath is filled with a first fluid solution identical in chemical makeup to the microsphere solution except for the microspheres. The chamber is filled to the height of the O-ring which secures the condom on the contoured form and, therefore, surrounds the entire test portion of the condom. Air escapes through an overflow port 6 at the level of the O-ring. The nylon mesh restrainer 3 is fixed in the bath chamber 1 so that when the contoured form is inserted into the bath, the form will be surrounded by the mesh.

With the apparatus assembled in this way, the condom is filled with the second microsphere fluid solution through a hole bored through the axial center of the contoured form. The nylon mesh restricts the expansion of the condom to the anthropomorphic dimensions. Chamber fluid displaced from the expansion of the condom escapes through the overflow port 6 until expansion is complete.

A static pressure is maintained during a condom test by a fluid column 7 leading to a reservoir 8 held at a specified height. The fluid column and reservoir supply the second microsphere fluid solution to the interior of the condom. The pressure is monitored with a pressure probe 9 to maintain a pressure head across the condom membrane of 60 mmHg. Although a pressure gradient exists along the inner surface of the condom due to the increasing fluid depth (by $\rho gh$, where $\rho$ is the density of fluid, g is the force of gravity, and h is the depth of fluid), the same pressure gradient exists on the outer surface of the condom due to the chamber bath fluid pressure. Therefore, the differential pressure, 60 mmHg, is uniform over the entire surface of the condom.

The temperature of the bath is monitored with a thermistor 10 in the bath chamber and is regulated with a heating tape 11 wrapped around the bath chamber. The accuracy of the controller should be ±0.5° C. The bandwidth of the controller was set to 0.3° C. in order to maintain a very narrow temperature range. A direct measurement in the heated bath without a mandrel or condom inserted, showed a temperature gradient of 2° C. (35° C. at the top of the bath to 37° C. near the bottom). The bath fluid is agitated with a magnetic mixing bar 12 and stirrer 13, or other suitable means, in order to disperse any microspheres which may pass through the latex barrier and to make the temperature as uniform as possible.

Ports in the bath chamber allow bath fluid to be continually pumped and circulated through tubing leading to a detection means, which in a preferred embodiment, as illustrated, comprises a spectrofluorometer 14 (SLM-Aminco SPF-500C, SLM Instruments, Inc., Urbana, Ill.) and then back to the chamber bath. A bath fill reservoir 15 is connected to a port in the bath chamber for filling and maintaining the necessary fluid level in the bath chamber.

The fluid from the bath is pumped by a suitable pump 16 through a flow cell in the holder of the spectrofluorometer sample chamber 17. Light from a xenon lamp within the spectrofluorometer passes through the excitation monochromator and illuminates the flow cell fluid. Fluorescent light emitted from the fluid, measured at an angle of 90 degrees from the excitation beam, enters the emission monochromator. A photomultiplier tube changes the output from the monochromator to a proportional voltage output which is then digitized with a computer (not shown) The spectrofluorometer was set to an excitation wavelength of 515 nm.

Control of the spectrofluorometer and acquisition of data is achieved through personal computer (not shown), e.g. an IBM PS/2 Model 30. A real-time plot of the voltage output versus time at a chosen wavelength and a complete wavelength scan are available through software options.

A test of a condom is done while the spectrofluorometer was in the slow kinetics mode which samples the data every 2 seconds for about 2000 seconds. The data was sampled for about 200 seconds before the test solution was introduced into the condom so that a zero-time level could be established. Then the condom was tested for 30 minutes (about 1800 seconds). If there is leakage of fluorescent microspheres through the barrier material, there will be a characteristic rise in the signal over the 30 minute time interval which will result in a calculable rate of increase of fluorescence. From the rate of increase of fluorescence, the flow rate through the barrier can be calculated. However, the flow rate is not the sole determinant of the rate of increase of fluorescence. Contaminants from the surface and within the barrier material leach into the bath and cause a low level rise in fluorescence measurement even without microspheres. This background signal, which must be accommodated in any analysis, limits the ultimate sensitivity of this system.

Figure 3:
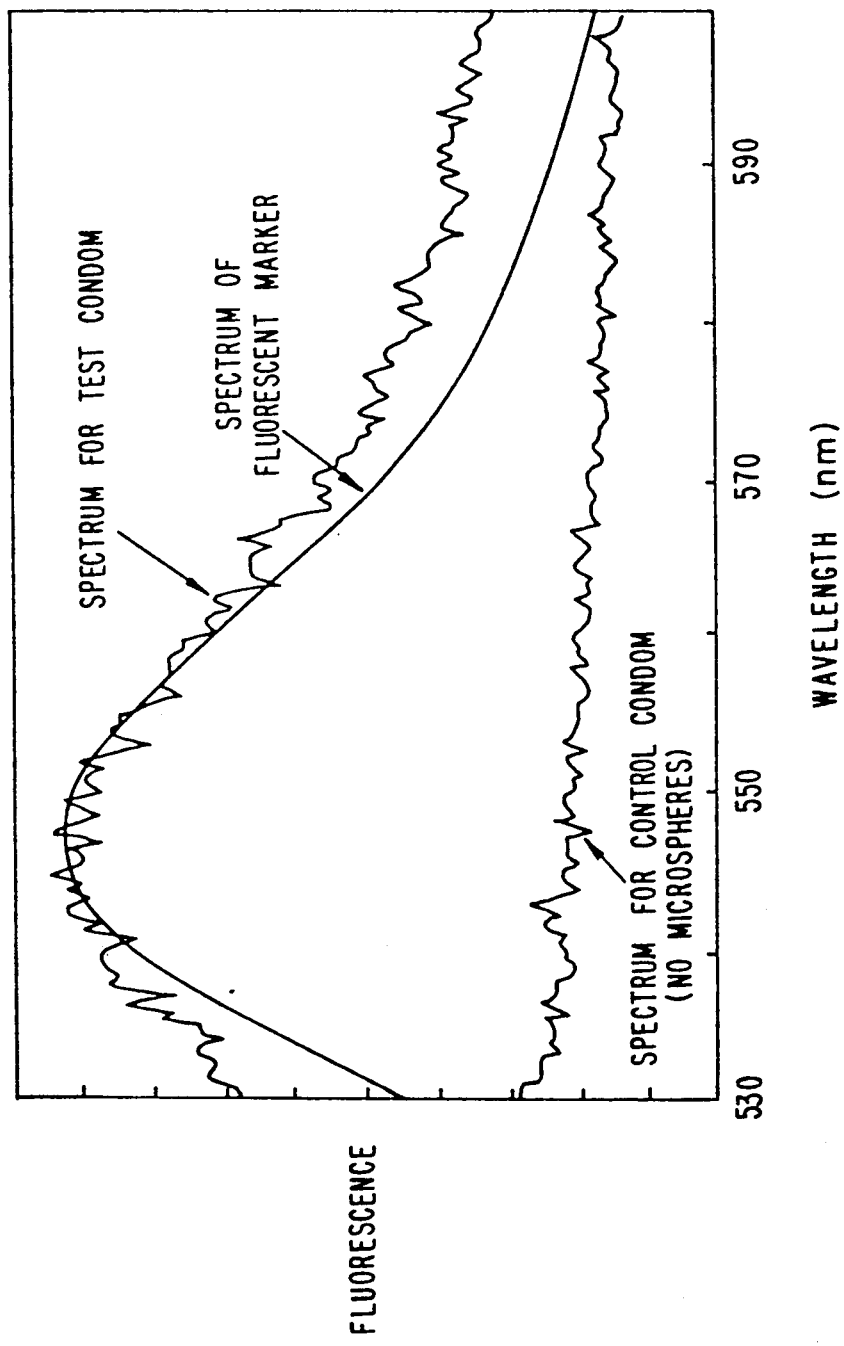
FIG. 3 is an overlaid spectral of initial, final and a test scan.

In order to distinguish microspheres from background, an emission wavelength scan (from 530 nm to 600 nm, step increment 0.5 nm) of the solution is taken at the beginning and end of each test. These comprise the initial and final spectral scans. The presence of fluorescent microspheres will result in a characteristic waveform in the final spectral scan as illustrated in FIG. 3 which is distinguishable from the background waveform apparent in the initial spectral scan. FIG. 3 also shows an overlaid waveform of a high concentration of fluorescent microspheres for comparison.

At a concentration of $3.4 \times 10^7$ microspheres per ml the spectrofluorometer is calibrated to 1.000 mV and the output is linear with concentrations from 0.1 mV to 10 mV. The initial concentration of the test solution placed on the inside of the condom is about $3.4 \times 10^{11}$ microspheres per ml. The sensitivity is about $1 \times 10^{-5}$ of the initial concentration.

Inherent in the manufacturing process of such microspheres is the formation of small micelles of uniform size whose presence in the test solution might complicate the analysis of any detected fluorescence. These micelles contain free fluorescent dye which is "packaged" by surrounding surfactant during a time-controlled phase of the manufacturing process. This time-controlled phase determines the size of the microspheres produced. To assure that the fluorescence measurements are of microsphere-attached dye, tests were conducted for micelle concentration using a 30,000 MW Nucleopore filter ($\approx 2$ nm pores) which was incorporated into a commercially-available centrifugation ultrafilter. The fluorescence due to micelles was measured to be 0.01% of that from dye attached to microspheres. Should only the micelles flow through the condom being tested, 20 ml or more of fluid would need to flow through the barrier before any fluorescence would be measured. The fluid volume added to the chamber would displace fluid through the overflow port at a clearly excessive rate (0.01μ liters/sec or about 13 drops/minute) before a minimal change in fluorescence would be measured. Unless this occurs, measurement of fluorescence from micelles can be ruled out.

The flow through the barrier can be calculated as follows:

$$C_i V = C_f(V_o + V) \qquad (1)$$

where $C_i$ is the concentration inside the condom, V is the volume passed through the barrier, $C_f$ is the final concentration of the chamber bath, and $V_o$ is the original volume of the chamber bath.

Since V is very small compared to $V_o$ for the flows being measured, V can be neglected on the right side of the equation. Since $Qt = V$, to obtain:

$$Q = C_f V_o / C_i t \qquad (2)$$

This flow can be related to the flow through a long tube which can be calculated with Poiseuille's equation:

$$Q = \pi r^4 p / 8 \mu l \qquad (3)$$

where r is the radius of tubing (radius of an assumed single hole in the condom), P is the pressure difference, $\mu$ is the viscosity, and l is the length of the tube (thickness of the condom).

A hole size, or rather a presumed single hole size, for a given measured flow rate can be calculated by solving for the radius r in equation (3):

$$r = (8Q\mu l/\pi P) \qquad (4)$$

where l was determined to be about 0.006 cm, μ is 0.70 centipoise, and P is 60 mmHg. However, the actual number of holes or pores can not be determined by this method. By equation (3) it can be seen that flow is proportional to the fourth power of the radius. Thus, flow through a single 10 μm hole is indistinguishable from the flow through ten thousand 1 μm holes.

High levels of fluorescence may be directly related to a volume flow rate (or effective hole size) since flow will be linearly related to the observed fluorescence at any wavelength near the spectral peak. However, in order to determine flow rates for low level signals, the spectrum of the background fluorescence must be subtracted from the spectrum of the fluorescent microspheres, and a least-squares fit to the data computed.

The levels of fluorescence over the wavelength range from 530 nm to 600 nm, measured at the beginning and at the end of each test, are assumed to be linear combinations of independent microsphere and background spectra. FIG. 3 illustrates this relationship. Data is recorded at 0.5 nm intervals, so that for 140 wavelengths, $\lambda_i$, the fluorescence level, $y_i$, can be expressed as $$y_i = f(\lambda_i) = a_1 g(\lambda_i) + a_2 h(\lambda_i), \qquad (5)$$

where g(λi) is the microsphere fluorescence and h(λi) is the background fluorescence, and $a_1$ and $a_2$ are the coefficients determined by a least-squares fit.

The ability of the system to identify small leaks will depend upon the uncertainty in the coefficient $a_1$ as $a_1$ approaches zero. If the uncertainty is chosen to be the standard deviation, σ, of the coefficient $a_1$;

$$\sigma^2 = \sum_{i=1}^{140} \sigma_i^2 (\sigma a_1/\sigma y_i)^2, \qquad (6)$$

where $\sigma_i = y_i^{\frac{1}{2}}$ for the expected poisson distributions of uncertainties in the measurement of $y_i$. Since there is the possibility of system contamination, fluorescence levels are determined by combining information from initial and final spectra:

$$a_1 = a_1[\text{final}] - a_1[\text{initial}] \qquad (7)$$

$$\sigma^2 = \sigma^2[\text{final}] + \sigma^2[\text{initial}] \qquad (8)$$

A suitable criterion for leakage of microspheres through a condom may be established as $a_1 \geq 20$, in which case the present system can resolve leak rates as small as 0.001μ liters/sec, or, alternatively, effective hole sizes of 3.8 μm with a less than 3% chance that there is no hole.

These results show that this technique is a sensitive test method for evaluating the permeability of intact prophylactics. We have quantified and incorporated into a test system several physiologic variables which no previous test system has employed. The test system provides an in-vitro test of barrier material permeability relevant to actual use. Extensive tests of currently marketed condoms are ongoing and will be reported in detail shortly.

For descriptive purposes, the apparatus and method of the present invention have been particularly described in reference to evaluating the permeability of condoms which is a preferred embodiment of the present invention. However, the present invention is not to be considered as limited thereto. In this regard, the principles of the present invention may be readily adapted for evaluating the permeability of a variety of articles made from rubber or other elastomeric materials including rubber gloves, dental dams, face masks, and the like. Moreover, the principles of the present invention are applicable for evaluating the permeability of non-rubber/elastomeric objects such as semipermeable membranes utilized in dialysis and other medical applications.

In applications other than evaluating the permeability of condoms, including those mentioned above, other suitable sized inert detectable particles which may be utilized may be selected from any optically detectable materials, such as brightly colored particles or electrically detectable materials. Moreover, permeability may be evaluated by utilizing different sizes of particles having a different color or fluorescence to gage the permeability of a membrane or article. Additionally, the particles may comprise non-detectable particles which are made detectable by labelling or tagging the particles with a detectable material.

Although the present invention has been described with reference to particular means, materials and embodiments, from the foregoing description, one skilled in the art can easily ascertain the essential characteristics of the present invention and various changes and modifications may be made to adapt the various usages and conditions without departing from the spirit and scope of the present invention as described in the claims which follow.

We claim:

1. An apparatus for evaluating the permeability of a membrane article which comprises:
    a test chamber for containing a first fluid;
    means to mount a membrane article in said test chamber so as to isolate the interior of the membrane article from the first fluid within said chamber, said mounting means including at least one port for supplying a second fluid to the interior of the membrane article;
    means for supplying a second fluid to the interior of the membrane article, said second fluid containing inert detectable particles;
    means for detecting for the presence of the inert detectable particles in the first fluid in said test chamber; and
    means for circulating the second fluid between said test chamber and said detection means, whereby said detection means detects for inert detectable particles which pass from the second fluid through the membrane article and into the first fluid.

2. An apparatus for evaluating the permeability of a membrane article according to claim 1 further including means to monitor and control the fluid pressure of the second fluid within the membrane article.

3. An apparatus for evaluating the permeability of a membrane article according to claim 1 further including means to monitor and control the temperature within said test chamber.

4. An apparatus for evaluating the permeability of a membrane article according to claim 1, wherein said means for detecting comprises means for optically detecting the inert detectable particles.

5. An apparatus for evaluating the permeability of a membrane article according to claim 4, wherein said means for detecting comprises means to detect fluorescence.

6. An apparatus for evaluating the permeability of a membrane article according to claim 1, wherein said test chamber includes means to restrain the shape of the membrane article under pressure.

7. An apparatus for evaluating the permeability of condoms which comprises:
   a test chamber for containing a first fluid;
   means to mount a condom in said test chamber so as to isolate the interior of the condom from the first fluid within said chamber, said mounting means including at least one port for supplying a second fluid to the interior of the condom;
   means for supplying a second fluid to the interior of the condom, either said first or said second fluid containing inert detectable particles;
   means for detecting for the presence of the inert detectable particles in at least one fluid in said test chamber; and
   means for circulating the fluid not initially containing the inert detectable particles between said test chamber and said detection means, whereby said detection means detects for inert detectable particles which pass from the initially inert particle containing fluid through the condom and into the initially particle free fluid.

8. An apparatus for evaluating the permeability of condoms according to claim 7 further including means to restrain the shape of the condom under pressure of the second fluid.

9. An apparatus for evaluating the permeability of condoms according to claim 7 further including means to monitor and control the fluid pressure of the second fluid within the condom.

10. An apparatus for evaluating the permeability of condoms according to claim 7 further including means to monitor and control the temperature within said test chamber.

11. An apparatus for evaluating the permeability of condoms according to claim 7 further including means to agitate the first fluid in said test chamber.

12. An apparatus for evaluating the permeability of condoms according to claim 7 wherein said means for detecting comprises means for optically detecting the inert detectable particles.

13. An apparatus for evaluating the permeability of condoms according to claim 12, wherein said means for detecting comprises means to detect fluorescence.

14. A method for evaluating the permeability of membrane articles which comprises:
   mounting said membrane article in a test chamber where one side is filled with a first fluid;
   supplying a second fluid to the other side of said membrane article, either said first or said second fluid containing inert detectable particles, and each of said first and second fluids being otherwise identical in chemical properties;
   monitoring the initially inert detectable particle free fluid to determine the presence of said inert detectable particles which have passed from the initially inert particle containing fluid through said membrane article and into the initially inert detectable particle free fluid.

15. A method for evaluating the permeability of membrane articles according to claim 14 further comprising restraining the shape of the membrane article to a predetermined shape by means of a restrainer.

16. A method for evaluating the permeability of membrane articles according to claim 14, wherein said monitoring comprises optically monitoring.

17. A method for evaluating the permeability of membrane articles according to claim 15, wherein said inert detectable particles have fluorescent properties and said monitoring comprises fluorescent monitoring.

18. A method for evaluating the permeability of membrane articles according to claim 14, further comprising monitoring and controlling the pressure within said membrane article and the temperature within said test chamber.

19. A method for evaluating the permeability of membrane articles according to claim 14, wherein said membrane article comprises a condom.

20. A method for evaluating the permeability of membrane articles which comprises:
   mounting said membrane article in a test chamber where one side is filled with a first fluid;
   supplying a second fluid to the other side of said membrane article, each of said first and second fluids comprising a saline solution and either said first or said second fluid containing inert detectable particles;
   monitoring the initially inert detectable particle free fluid to determine the presence of said inert detectable particles which have passed from the initially inert particle containing fluid through said membrane article and into the initially inert detectable particle free fluid.

* * * * *